(12) United States Patent
Maeda

(10) Patent No.: US 10,866,498 B2
(45) Date of Patent: Dec. 15, 2020

(54) WAVELENGTH CONVERSION ELEMENT, LIGHT SOURCE APPARATUS, AND IMAGE PROJECTION APPARATUS

(71) Applicant: CANON KABUSHIKI KAISHA, Tokyo (JP)

(72) Inventor: Yuuki Maeda, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/387,928

(22) Filed: Apr. 18, 2019

(65) Prior Publication Data

US 2019/0331993 A1 Oct. 31, 2019

(30) Foreign Application Priority Data

Apr. 25, 2018 (JP) ................. 2018-084263

(51) Int. Cl.
*G03B 21/20* (2006.01)
*H04N 9/31* (2006.01)

(52) U.S. Cl.
CPC ......... *G03B 21/204* (2013.01); *H04N 9/3105* (2013.01)

(58) Field of Classification Search
CPC .. G03B 21/14; G03B 21/2033; G03B 21/204;
H04N 9/31; H04N 9/3105; H04N 9/3182;
G02F 1/13; G02F 1/13357; F21V 7/28;
F21V 13/06; F21V 13/08
See application file for complete search history.

(56) References Cited

U.S. PATENT DOCUMENTS

| 8,746,888 | B2 | 6/2014 | Silverstein |
| 9,599,293 | B2 | 3/2017 | Hikmet et al. |
| 2015/0316781 | A1 | 11/2015 | Maeda |
| 2019/0302600 | A1* | 10/2019 | Arakawa ............... G03B 21/204 |
| 2019/0310540 | A1 | 10/2019 | Maeda |

FOREIGN PATENT DOCUMENTS

| JP | 2004341105 A | 12/2004 |
| JP | 2012137744 A | 7/2012 |

* cited by examiner

*Primary Examiner* — William C. Dowling
(74) *Attorney, Agent, or Firm* — Carter, DeLuca & Farrell LLP

(57) ABSTRACT

A wavelength conversion element includes first to fourth wavelength converters configured to convert incident from a light source into first to fourth light fluxes having first to fourth wavelength band different from a wavelength band of the light from the light source and first to fourth peak intensities at first to fourth wavelengths. The first to fourth wavelengths satisfy predetermined conditions.

10 Claims, 10 Drawing Sheets

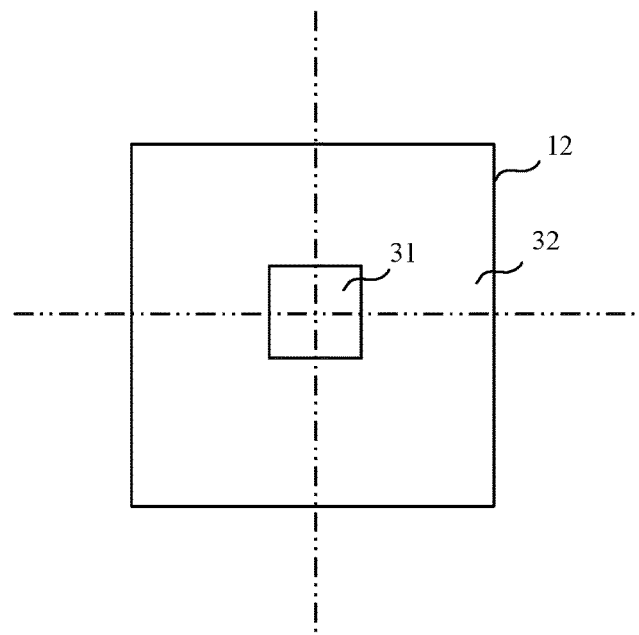
FIG. 2
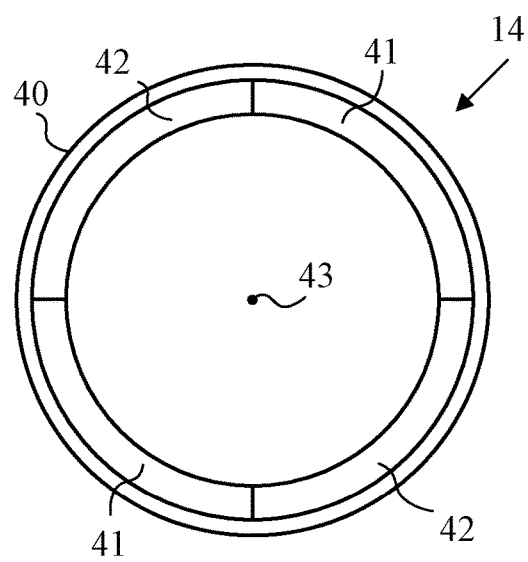 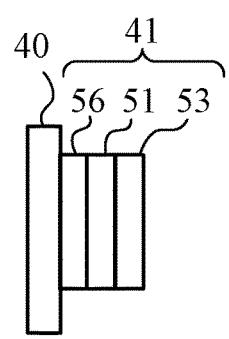 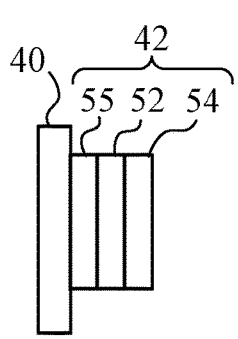
FIG. 3A  FIG. 3B  FIG. 3C

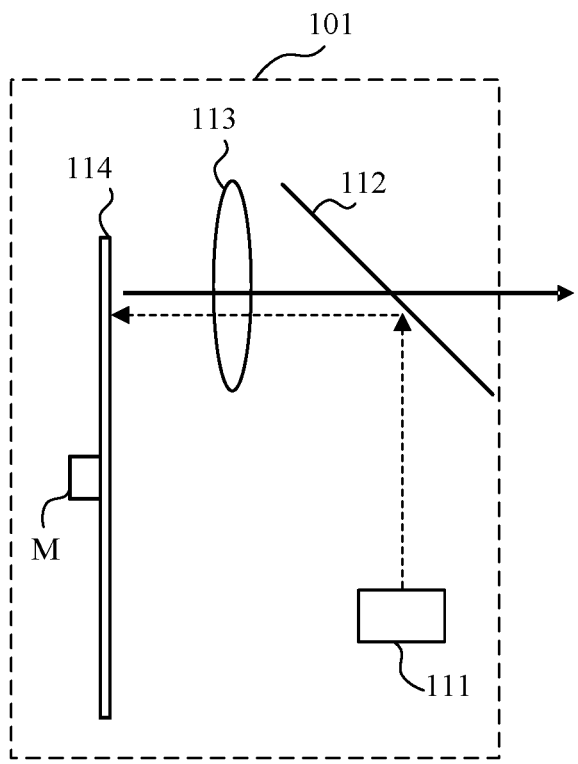
FIG. 6
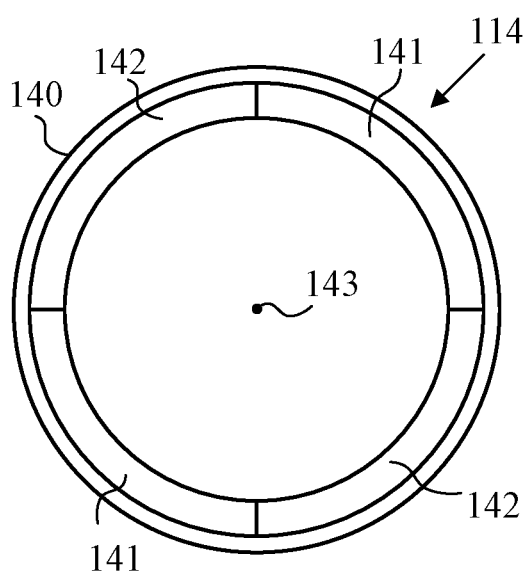
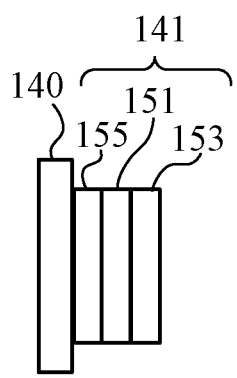
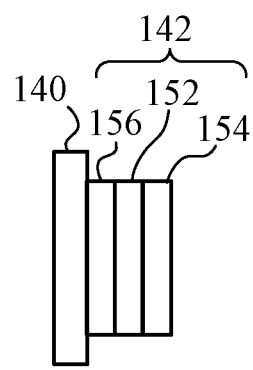
FIG. 7A     FIG. 7B     FIG. 7C

WAVELENGTH CONVERSION ELEMENT, LIGHT SOURCE APPARATUS, AND IMAGE PROJECTION APPARATUS

BACKGROUND OF THE INVENTION

Field of the Invention

The present invention relates to a wavelength conversion element used for a light source apparatus suitable for an image projection apparatus (projector).

Description of the Related Art

Some projectors generate, as disclosed in Japanese Patent Laid-Open No. ("JP") 2012-137744, fluorescent light by irradiating excitation light from a light source to a fluorescent body, and project and display an image using combined light containing the fluorescence light and unconverted light that is not converted into the fluorescent light or has an unconverted wavelength among the excitation light. JP 2004-341105 discloses a color wheel in which a plurality of fluorescent body layers are arranged in a circumferential direction and configured to sequentially emit red (R) light, green (G) light, and blue (B) light as fluorescent light using ultraviolet light as excitation light.

SUMMARY OF THE INVENTION

The present invention provides a wavelength conversion element, a light source apparatus, and an image projection apparatus using the same, each of which can emit a plurality of color light fluxes having good color purity and luminance with a simple configuration.

A wavelength conversion element according to one aspect of the present invention includes a first wavelength converter configured to convert light from a light source into first light having a first wavelength band different from a wavelength band of the light from the light source, and a first peak intensity at a first wavelength, a second wavelength converter configured to convert the light from the light source into second light having a second wavelength band different from the wavelength band of the light from the light source, and a second peak intensity at a second wavelength, a third wavelength converter configured to convert the light from the light source into third light having a third wavelength band different from the wavelength band of the light from the light source, and a third peak intensity at a third wavelength, and a fourth wavelength converter configured to converting the light from the light source into fourth light having a fourth wavelength band different from the wavelength band of the light from the light source, and a fourth peak intensity at a fourth wavelength. 505 nm<$w1$<$w2$<585 nm is satisfied where $w1$ is the first wavelength and $w2$ is the second wavelength. A wavelength band having an intensity of 30% or higher of the first peak intensity in the first wavelength band and a wavelength band having an intensity of 30% or higher of the second peak intensity in the second wavelength band are different from each other. 585 nm<$w3$<$w4$<670 nm is satisfied where $w3$ is the third wavelength and $w4$ is the fourth wavelength. A wavelength band having an intensity of 30% or higher of the third peak intensity in the third wavelength band and a wavelength band having an intensity of 30% or higher of the fourth peak intensity in the fourth wavelength band are different from each other. The first wavelength converter and the third wavelength converter are laminated or mixed on a first region in the wavelength conversion element, and the second wavelength converter and the fourth wavelength converter are laminated or mixed on a second region in the wavelength conversion element. A light source apparatus and an image projection apparatus having the above wavelength conversion element also constitute another aspect of the present invention.

Further features of the present invention will become apparent from the following description of exemplary embodiments with reference to the attached drawings.

BRIEF DESCRIPTION OF THE DRAWINGS

FIG. 2 illustrates a configuration of a light separation element according to example 1.

FIGS. 3A to 3C illustrate a configuration of a wavelength conversion element according to example 1.

FIG. 6 illustrates a configuration of a light source apparatus of a projector according to example 2 of the present invention.

FIGS. 7A-7C illustrate a configuration of a wavelength conversion element according to example 2.

DESCRIPTION OF THE EMBODIMENTS

Referring now to the accompanying drawings, a description will be given of embodiments according to the present invention.

Example 1

Figure 1:
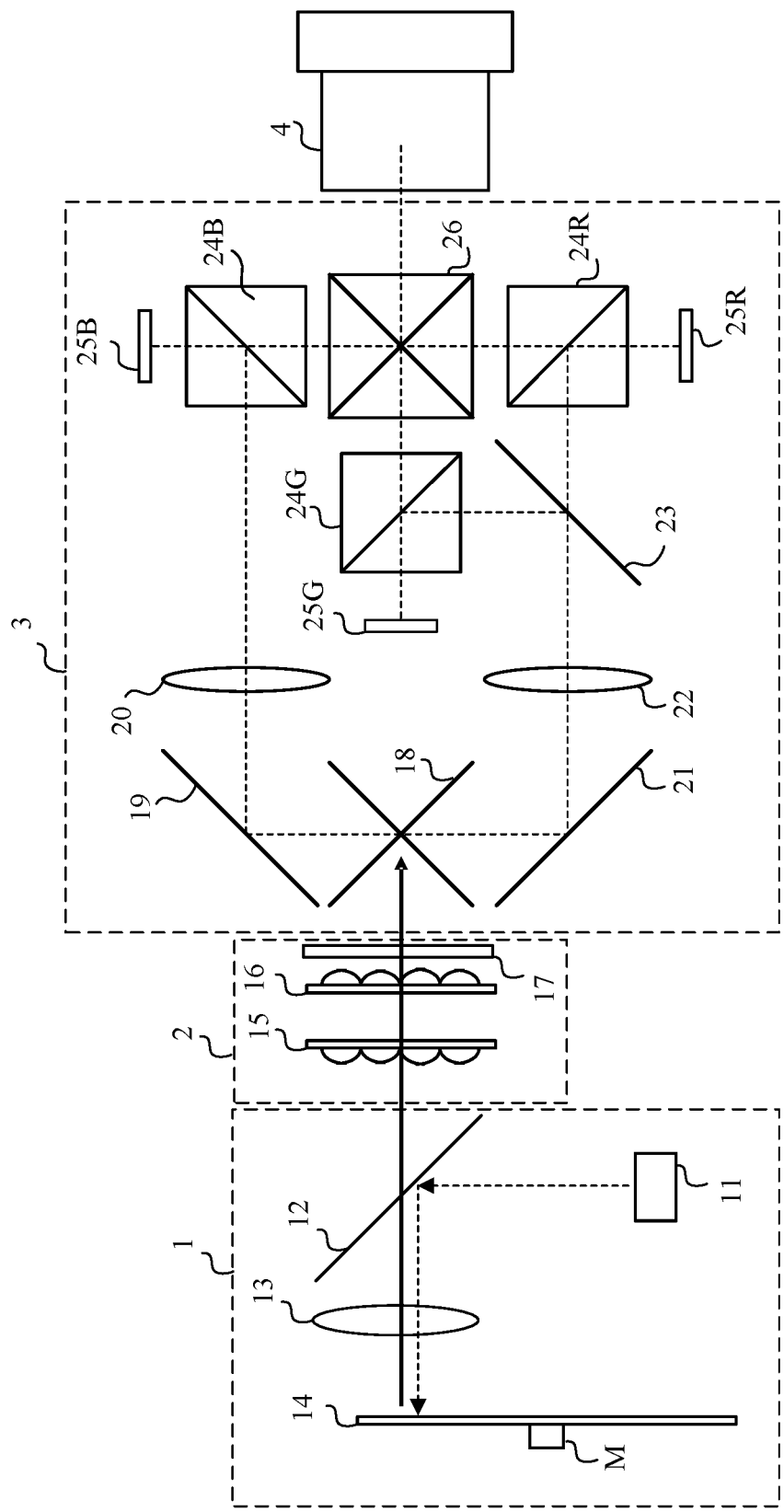
FIG. 1 illustrates a configuration of a projector according to example 1 of the present invention.

FIG. 1 illustrates a configuration of an optical system of a projector as an image projection apparatus according to example 1 of the present invention. The projector has a light source unit 1 as a light source apparatus, an illumination optical system 2, a color separation and combination system 3, and a projection lens 4 as a projection optical system.

The light source unit 1 includes an LD unit 11, a light separation element 12, a collimator lens 13, and a wavelength conversion element 14. The LD unit 11 includes a plurality of blue laser diodes (LDs).

FIG. 2 illustrates a configuration of the light separation element 12. The light separation element 12 has an A region 31 that reflects first blue light (peak intensity wavelength of $w0$) emitted from the LD unit 11 and transmits other color light, and a B region 32 that encloses the A region 31 and transmits visible light. The first blue light from the LD unit 11 is reflected by the A region 31 in the light separation element 12, condensed by the collimator lens 13, and irradiated onto the wavelength conversion element 14 as excitation light (incident light).

FIG. 3A illustrates a configuration of the wavelength conversion element 14 according to this example. The wavelength conversion element 14 is rotationally driven by the motor M illustrated in FIG. 1 around its center 43. The wavelength conversion element 14 has a disk-shaped reflective substrate 40 having a light reflection characteristic, two first regions 41 and two second regions 42 disposed on the reflection substrate 40.

In this example, the first regions 41 and the second regions 42 are alternately arranged in the circumferential direction in four equally divided areas on the reflective substrate 40. As the wavelength conversion element 14 rotates, the excitation light is alternately applied to the first region 41 and the second region 42.

FIG. 3B illustrates a section of the first region 41 of the reflective substrate 40 (the wavelength conversion element 14) taken along a radial direction. The first region 41 includes a third quantum dot layer (third wavelength converter) 53, a first quantum dot layer (first wavelength converter), and a diffusion layer (diffuser) 56 laminated (or stacked) in this order from an incident side of the excitation light from the LD unit 11 (referred to as light incident side hereinafter). FIG. 3C illustrates a section of the second region 42 of the reflective substrate 40 taken along the radial direction. The second region 42 includes a fourth quantum dot layer (fourth wavelength converter) 54, a second quantum dot layer (second wavelength converter) 52, and a quantum dot layer (fifth wavelength converter) 55 laminated in this order from the light incident side.

Each of the first to fifth quantum dot layers 51 to 55 includes a plurality of quantum dots or quantum rods for a wavelength conversion of the first blue light as excitation light (incident light) into light having a wavelength band different from that of the first blue light. The quantum dots or quantum rods included in the first to fifth quantum dot layers 51 to 55 convert the first blue light into light of different wavelength bands. In the following description, that the quantum dots or quantum rods included in each quantum dot layer convert the wavelength is refers to as that the quantum dot layer converts the wavelength.

The first quantum dot layer 51 converts the first blue light into the first green light (first light having a first peak intensity at a first wavelength w1) as light with the first wavelength band. The second quantum dot layer 52 converts the first blue light into second green light (second light having a second peak intensity at a second wavelength w2) as light with a second wavelength band. The third quantum dot layer 53 converts the first blue light into first red light (third light having a third peak intensity at a third wavelength w3) as light with a third wavelength band.

The fourth quantum dot layer 54 converts the first blue light into the second red light (fourth light having a fourth peak intensity at a fourth wavelength w4) as light with the fourth wavelength band. The fifth quantum dot layer 55 converts the first blue light into the second blue light (fifth light having a fifth peak intensity at a fifth wavelength w5) as light with the fifth wavelength band.

The diffusion layer 56 diffuses unconverted light (first blue light), which is excitation light that has entered the first region 41 but its wavelength has not been converted by the third and first quantum dot layers 53 and 51. The reflective substrate 40 reflects light traveling to the side opposite to the light incident side in the first and second regions 41 and 42 so as to return the light to the light incident side.

When the excitation light enters the first region 41, the first green light, the first red light, and the first blue light (unconverted light) are emitted from the wavelength conversion element 14. The first green light, the first red light, and the first blue light are collectively referred to as a spectrum A.

On the other hand, when the excitation light enters the second region 42, the second green light, the second red light, and the second blue light are emitted from the wavelength conversion element 14. The second green light, the second red light, and the second blue light are collectively referred to as a spectrum B.

Figure 4:
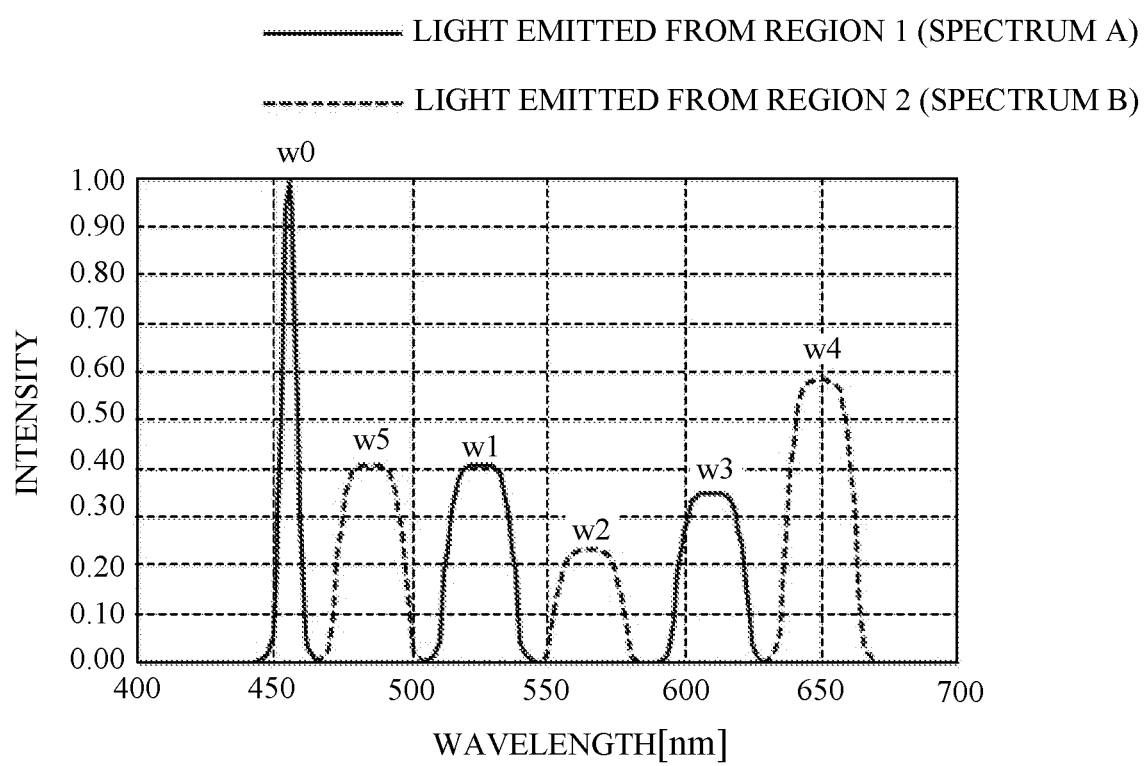
FIG. 4 illustrates spectra of light emitted from the wavelength conversion element according to example 1.

FIG. 4 illustrates the spectrum of light emitted from the wavelength conversion element 14. A solid line denotes the spectrum A containing the first green light (w1), the first red light (w3), and the first blue light (w0) emitted from the first region 41. A broken line denotes the spectrum B containing the second green light (w2), the second red light (w4), and the second blue light (w5) emitted from the second region 42. Numerical example 1 shows the peak intensity wavelengths w1 to w5 of these color light fluxes illustrated in FIG. 4.

(Numerical Example 1)

w0=455 nm
w1=525 nm
w2=565 nm
w3=610 nm
w4=650 nm
w5=480 nm

White light containing a plurality of color light fluxes emitted from the wavelength conversion element 14 passes through the A region 31 and the B region 32 in the light separation element 12 illustrated in FIGS. 1 and 2 and enters the illumination optical system 2. Although part of the first blue light as unconverted light is reflected by the A region 31, the amount is small and thus the color and amount of the illumination light hardly change.

The illumination optical system 2 includes a first fly eye lens 15, a second fly eye lens 16, and a polarization conversion element 17. The illumination light that has entered the first fly eye lens 15 is divided into a plurality of light beams (fluxes), is condensed, passes through the second fly eye lens 16, and forms a plurality of light source images. The polarization conversion element 17 is provided near the position where the light source image is formed. The illumination light as nonpolarized light incident on the polarization conversion element 17 is converted by the polarization conversion element 17 into linear polarization light (S-polarized light) having a predetermined polarization direction and enters the color separation and combination system 3.

The blue light (first and second blue light fluxes) of the illumination light that has entered the color separation and combination system 3 is reflected by a cross dichroic mirror 18 towards a first mirror 19. The green light (first and second green light fluxes) and the red light (first and second red light fluxes) are reflected by the cross dichroic mirror 18 toward a second mirror 21.

A plurality of light fluxes as the blue light reflected by the first mirror 19 are condensed by a first condenser lens 20, reflected by a first PBS (polarization beam splitter) 24B, and superimposed on a first reflective liquid crystal panel 25B. The first PBS 24B serves to reflect the S-polarized light and to transmit the P-polarized light.

The first reflective liquid crystal panel 25B modulates the incident blue light (S-polarized light) according to an image signal input to the projector. The blue light (P-polarized light as modulated light) modulated by the first reflective liquid crystal panel 25B passes through the first PBS 24B, is reflected by a cross dichroic prism 26, and is guided to the projection lens 4.

On the other hand, the green light and the red light reflected by the second mirror 21 are condensed by a first condenser lens 22. Then, the green light is reflected by a dichroic mirror 23, and the red light transmits through the dichroic mirror 23. A plurality of light fluxes as green light reflected by the dichroic mirror 23 are reflected by a second PBS 24G, and are superimposed on the second reflective liquid crystal panel 25G by the condensing action of the first condenser lens 22 described above.

The second PBS 24G also serves to reflect the S-polarized light and to transmit the P-polarized light. The second reflective liquid crystal panel 25G modulates the incident green light (S-polarized light) according to the image signal. The blue light (P-polarized light as modulated light) modulated by the second reflective liquid crystal panel 25G passes through the second PBS 24G, passes through the cross dichroic prism 26, and is guided to the projection lens 4.

A plurality of light fluxes that have transmitted as the red light through the dichroic mirror 23 are reflected by a third PBS 24R, and are superimposed on a third reflective liquid crystal panel 25R by the condensing function of the first condenser lens 22 described above. The third PBS 24R also serves to reflect the S-polarized light and to transmit the P-polarized light. The third reflective liquid crystal panel 25R modulates the incident red light (S-polarized light) according to the above image signal. The red light (P-polarized light as modulated light) modulated by the third reflective liquid crystal panel 25R passes through the third PBS 24R, is reflected by the cross dichroic prism 26, and is guided to the projection lens 4.

The green, blue, and red light fluxes combined by the transmission and reflection by the cross dichroic prism 26 are projected as projection light (combined light) from the projection lens 4 onto a projection surface such as an unillustrated screen. Thus, the projection image is displayed.

Assume that a period for modulating light by the first to third reflective liquid crystal panels 25B, 25G, and 25R (or switching period of the projected image) is 120 Hz in the projector configured as described above. Then, the projection image can be combined with the spectrum forming the projection image by switching the spectra A and B as light incident on the first to third reflective liquid crystal panels 25B, 25G, and 25R at 120 Hz.

Since the first and second regions 41 and 42 are assigned to four equally divided areas in the circumferential direction in the wavelength conversion element 14 according to this example, the spectra A and B are emitted at 120 Hz by rotating the wavelength conversion element 14 thirty times per second.

Assume that along with the projector having this configuration, a right-eye filter of the color separation glasses worn by the viewer has a characteristic of transmitting the spectrum A and of reflecting the spectrum B, and a left-eye filter has a characteristic of transmitting the spectrum B and of reflecting the spectrum A. Then, when the spectrum A is emitted from the wavelength conversion element 14, the projection image for the right eye is displayed, and when the spectrum B is emitted, the projection image for the left eye having a parallax relative to the projection image for the right eye is displayed. Thereby, a single projector according to this example can realize the 3D display in the wavelength division method.

The right-eye filter and the left-eye filter of the color separation glasses may have characteristics opposite to the above characteristics. In that case, when the spectrum A is emitted from the wavelength conversion element 14, the projection image for the left eye is displayed, and when the spectrum B is emitted, the projection image for the right eye is displayed.

When the 3D display is not performed, it is unnecessary to synchronize the switching period of the spectrum from the wavelength conversion element 14 with the modulation period of each reflective liquid crystal panel, so the spectrum A and the spectrum B can be processed at a high speed of 120 Hz or higher. By switching the spectrum at high speed, the human eye recognizes it as a spectrum obtained by averaging the spectrum A and the spectrum B. Thus, the projector may be designed so as to achieve the desired image quality with the spectrum obtained by averaging the spectra A and B.

The wavelength conversion element 14 according to this example includes the first quantum dot layer 51, the third quantum dot layer 53, and the diffusion layer 56 laminated on the first region 41, and the quantum dot layer 52, the fourth quantum dot layer 54, and the fifth quantum dot layer 55 laminated on the second region 42.

However, the first region 41 may include one mixed layer in which a quantum dot or quantum rod used for each of the first and third quantum dot layers and a light diffusion material used for the diffusion layer are mixed. Similarly, the second region 42 may include one mixed layer in which the quantum dot or the quantum rods used in the second quantum dot layer, the fourth quantum dot layer, and the fifth quantum dot layer are mixed.

While the wavelength conversion element 14 according to this example includes totally four first and second regions 41 and 42 in the circumferential direction, totally two or more first and second regions may be provided.

The wavelength conversion element 14 according to this example is a reflection type wavelength conversion element having the reflective substrate 40, but it may be a transmission type wavelength conversion element using a transmissive substrate having a light transmission characteristic instead of the reflective substrate. In this case, the transmissive substrate may be made of a material having a high light transmittance and a high thermal conductivity, such as sapphire.

Although the color separation and combination system 3 according to this example uses a reflective liquid crystal panel as a light modulation element, a transmission type liquid crystal panel or a digital micro mirror device may be used.

A description will be given of a condition suitable for this example. The peak intensity wavelength of each color light may satisfy the following conditions.

505 nm<w1<w2<585 nm
585 nm<w3<w4<670 nm
410 nm<w0<w5<505 nm

Three primary color light fluxes of R, G and B are required to display a projection image with a proper image quality. When the above conditions are not satisfied, the image quality deteriorates for the projection image displayed by the spectrum A or B. The following conditions may be satisfied.

510 nm<w1<540 nm<w2<580 nm
590 nm<w3<630 nm<w4<670 nm
430 nm<w0<470 nm<w5<500 nm

This example sets the spectra A and B so that they overlap each other. However, the wavelength band in the wavelength band of the first green light (first wavelength band) in which the first green light has an intensity of 30% or higher of the first peak intensity and the wavelength band in which the second green light has an intensity of 30% or higher of the second peak intensity in the wavelength band of the second green light (second wavelength band) may be different from each other (or do not overlap each other).

A wavelength band in which the first red light has an intensity of 30% or higher of the third peak intensity in the first red light wavelength band (third wavelength band) and a wavelength band in which the second red light has an intensity of 30% or higher of the fourth peak intensity in the second red light (fourth wavelength band) may be different from each other (do not overlap each other).

A wavelength band in which the second blue light has an intensity of 30% or higher of the fifth peak intensity in the second blue light wavelength band (fifth wavelength band), and a wavelength band in which the intensity is 30% or higher of its peak intensity in a wavelength band of the first blue light may be different from each other (do not overlap each other).

If these conditions are not satisfied, the light of the spectrum B which forms the projection image for the left eye is mixed in the right eye of the observer in the 3D display in the wavelength division system, and the light of the spectrum A which forms the projection image for the right eye is mixed in the left eye. In other words, the crosstalk occurs and the three-dimensional effect is reduced or lost.

A wavelength band in which the light in each of the first to fifth wavelength bands has an intensity of 10% or higher of its peak intensity and a wavelength band in which the excitation light (incident light) has an intensity of 10% or higher of its peak intensity may be different from each other.

When the excitation light is irradiated to the boundary between the first region 41 and the second region 42 in the 3D display, a spectrum in which the spectra A and B are mixed is projected. Hence, the light of the spectrum B which forms the projection image for left eyes is mixed in the right eye of the observer, or the light of the spectrum A which forms the projection image for right eyes is mixed in the left eye, the crosstalk occurs, and the three-dimensional feeling is lost.

Therefore, the power of the light source may be turned off (or the light emission from the light source unit may be stopped) while the excitation light is applied to the boundary between the first region 41 and the second region 42. Alternatively, when the liquid crystal panel can be driven at a high speed, the liquid crystal panel may display black.

Figure 5:
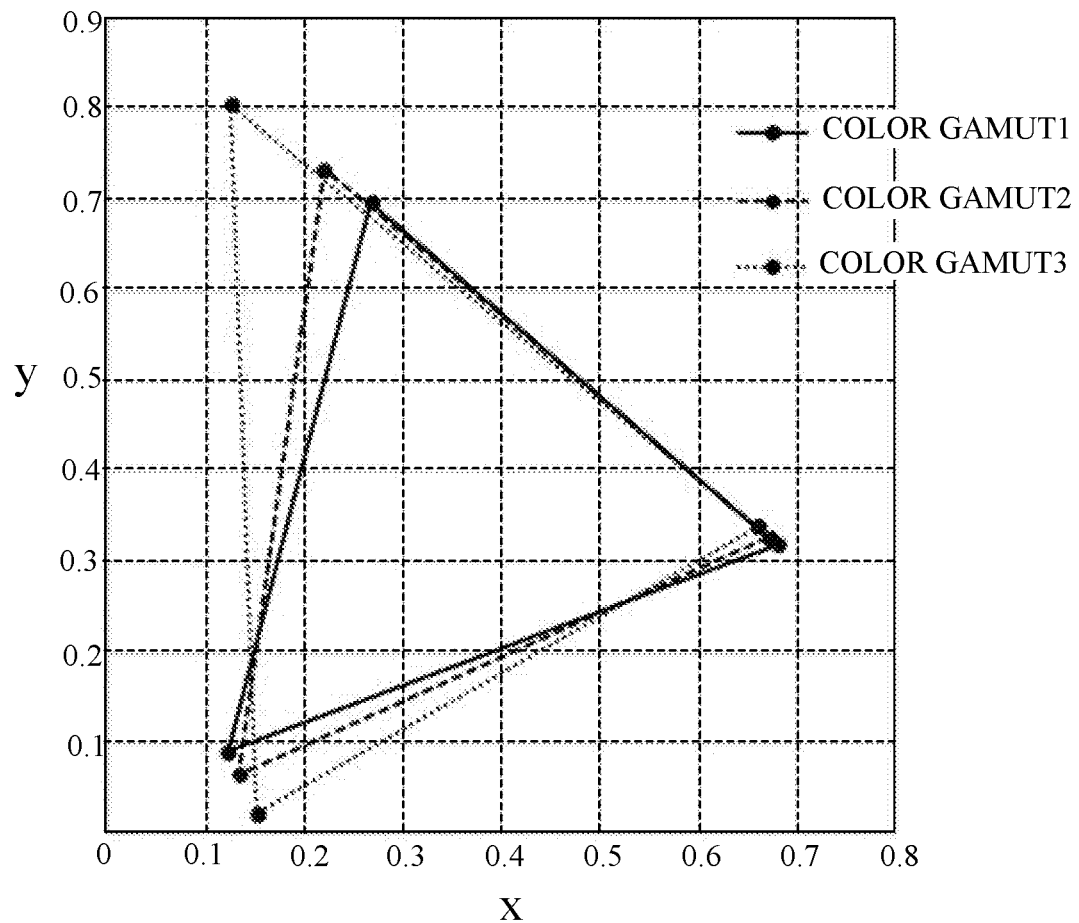
FIG. 5 is an xy coordinate diagram showing a color gamut of projection light from the projector according to example 1.

The color gamut of the illumination light (or the projection light) may be changed by controlling turning on and off of the power supply in the light source. FIG. 5 illustrates the color gamut of the projection light (or the color range reproducible in the projection image from the projector) when the time for irradiating the excitation light onto the second region 42 is changed.

Color gamut 1 indicates a color gamut when the irradiation time of the excitation light is set to 100% onto each of the first region 41 and the second region 42. Color gamut 2 indicates the color gamut when the irradiation time onto the first region 41 is set to 100% and the irradiation time to the second region 42 is set to 50%. Color gamut 3 indicates a color gamut when the irradiation time onto the first region 41 is set to 100% and no excitation light is irradiated onto the second region 42.

The color gamut of the projection light can be changed according to the projection image by controlling the illumination time of the excitation light onto the second region 42 as described above. Similarly, even if the irradiation time of the excitation light onto the first region 41 is changed, the color gamut of the projection light can be changed.

Example 2

FIG. 6 illustrates a configuration of a light source apparatus 101 used in a projector according to example 2 of the present invention. The light source apparatus 101 includes an LD unit 111, a light separation element 112, a collimator lens 113, and a wavelength conversion element 114. The LD unit 111 includes a plurality of ultraviolet light LDs. The light separation element 112 has a characteristic of reflecting ultraviolet light emitted from the LD unit 111 and of transmitting visible light.

The near-ultraviolet light (having a peak intensity at the wavelength w0) emitted from the LD unit 111 is reflected by the light separation element 112, condensed by the collimator lens 113, and irradiated as excitation light onto the wavelength conversion element 114.

FIG. 7A illustrates the configuration of the wavelength conversion element 114 according to this example. The wavelength conversion element 114 is rotationally driven around its center 143 by the motor M illustrated in FIG. 6. The wavelength conversion element 114 has a disk-shaped reflective substrate 140 having a light reflectance characteristic, and two first regions 141 and two second regions 142 arranged on the reflective substrate 140. In this example, the first regions 141 and the second regions 142 are alternately arranged in the circumferential direction in four equally divided areas on the reflective substrate 140. As the wavelength conversion element 114 rotates, the excitation light is alternately emitted to the first region 141 and the second region 142.

FIG. 7B illustrates a section of the first region 141 of the reflective substrate 140 (the wavelength conversion element 114) taken along the radial direction. The first region 141 includes a third quantum dot layer (third wavelength converter) 153, a first quantum dot layer (first wavelength converter) 151, and a quantum dot layer (fifth wavelength converter) 155 laminated in this order from the light incident side. FIG. 7C illustrates a section of the second region 142 of the reflective substrate 140 taken along the radial direction. The second region 142 includes a fourth quantum dot layer (fourth wavelength converter) 154, a second quantum dot layer (second wavelength converter) 152, and a sixth quantum dot layer (sixth wavelength converter) 156 laminated in this order from the light incident side.

Each of the first to sixth quantum dot layers 151 to 156 includes a plurality of quantum dots or quantum rods for the wavelength conversion of the near-ultraviolet light as the excitation light (incident light) into light having a different wavelength band. The first to sixth quantum dot layers 151 to 156 (quantum dots or quantum rods included in the quantum dot layers) convert the near-ultraviolet light into the light of different wavelength bands.

The first quantum dot layer 151 converts the near-ultraviolet light into first green light (first light having a first peak intensity at a first wavelength w1) as light in a first wavelength band. The second quantum dot layer 152 converts the near-ultraviolet light into second green light (second light having a second peak intensity at a second wavelength w2) as light in a second wavelength band. The third quantum dot layer 153 converts the near-ultraviolet light into first red light (third light having a third peak intensity at a third wavelength w3) as light in a third wavelength band.

The fourth quantum dot layer 154 converts the near-ultraviolet light into second red light (fourth light having a fourth peak intensity at a fourth wavelength w4) as light in a fourth wavelength band. The fifth quantum dot layer 155 converts the near-ultraviolet light into first blue light (fifth light having a fifth peak intensity at a fifth wavelength w5) as light in a fifth wavelength band. The sixth quantum dot layer 156 converts the near-ultraviolet light into second blue light (sixth light having a sixth peak intensity at a sixth wavelength w6) as light in a fifth wavelength band.

The reflective substrate 140 reflects light traveling to the side opposite to the light incident side in the first and second regions 141 and 142 so as to return the light to the light incident side.

When the excitation light is irradiated onto the first region 141, the first green light, the first red light, and the first blue light are emitted from the wavelength conversion element 114. The first green light, the first red light, and the first blue light are collectively referred to as the spectrum A.

On the other hand, when the excitation light is irradiated onto the second region 142, the second green light, the second red light, and the second blue light are emitted from the wavelength conversion element 114. The second green light, the second red light, and the second blue light are collectively referred to as the spectrum B.

Figure 8:
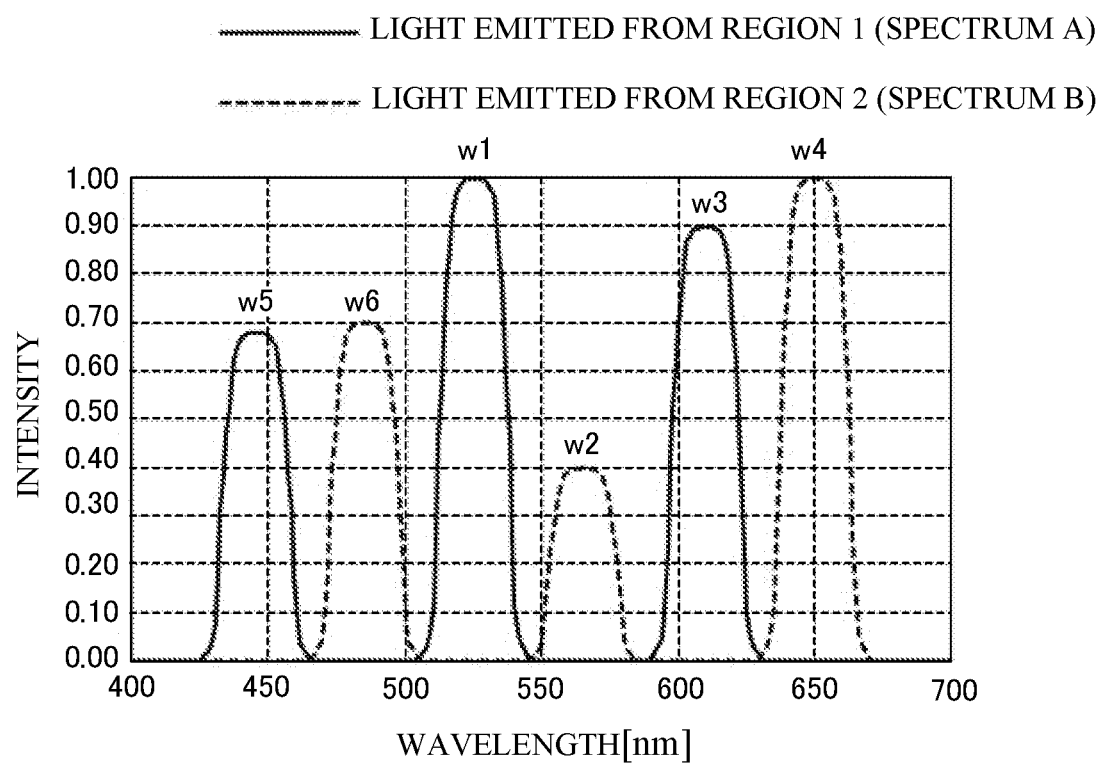
FIG. 8 illustrates spectra of light emitted from the wavelength conversion element according to example 2.

FIG. 8 illustrates the spectrum of light emitted from the wavelength conversion element 114. A solid line illustrates the spectrum A containing the first green light (w1), the first red light (w3), and the first blue light (w5) emitted from the first region 141. A broken line illustrates the spectrum B containing the second green light (w2), the second red light (w4), and the second blue light (w6) emitted from the second region 142. Numerical example 2 shows the peak intensity wavelengths w0 to w6 of the respective color light fluxes illustrated in FIG. 8

(Numerical Example 2)

w0=400 nm
w1=525 nm
w2=565 nm
w3=610 nm
w4=650 nm
w5=445 nm
w6=480 nm

Example 3

Figure 9:
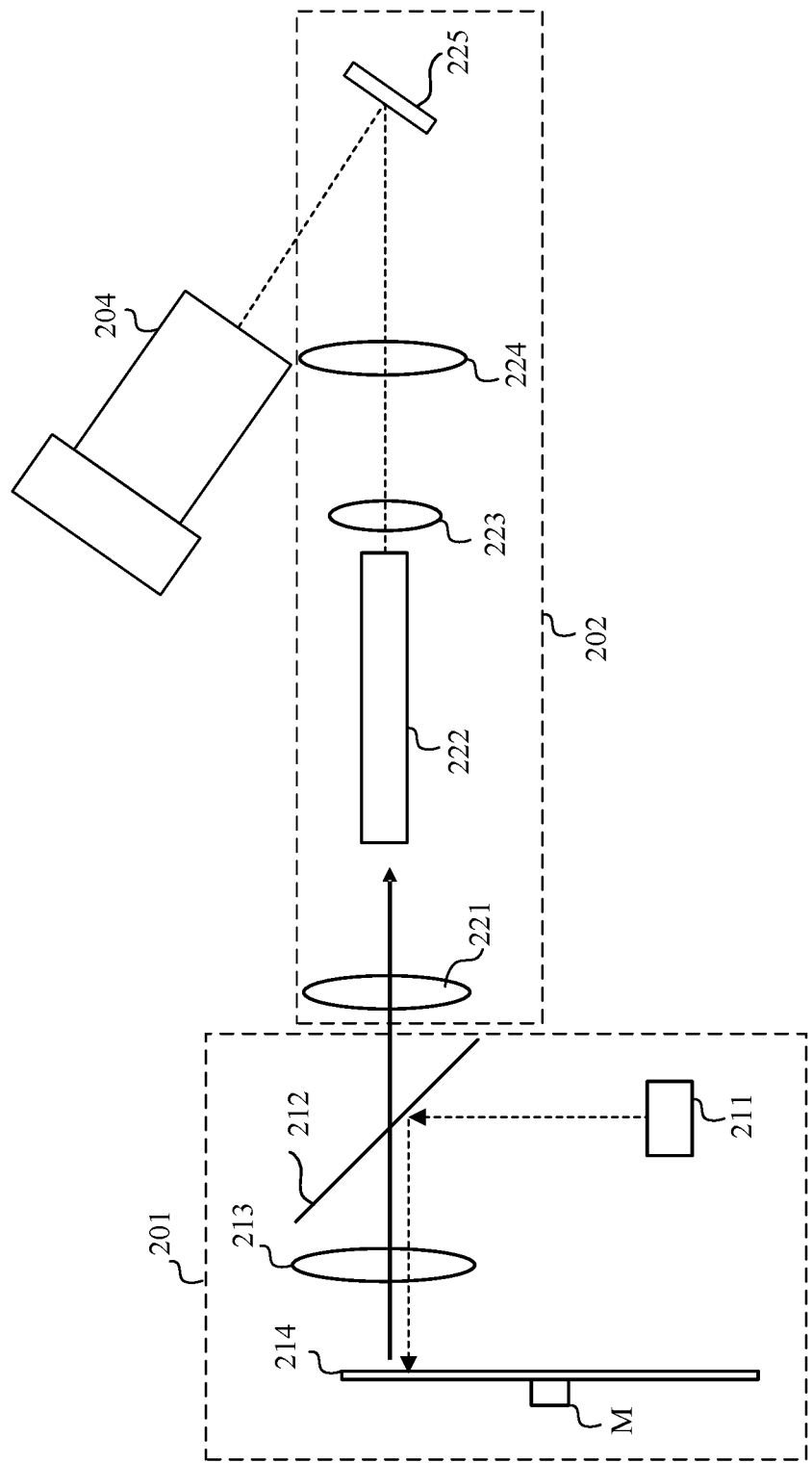
FIG. 9 illustrates a configuration of a projector according to example 3 of the present invention.

FIG. 9 illustrates a configuration of an optical system of a projector according to example 3 of the present invention. The projector includes a light source unit 201, an illumination optical system 202, and a projection lens 204 as a projection optical system.

The light source unit 201 includes an LD unit 211, a light separation element 212, a collimator lens 213, and a wavelength conversion element 214. The LD unit 211 includes a plurality of ultraviolet light LDs. The light separation element 212 has a characteristic of reflecting ultraviolet light and of transmitting visible light.

The near-ultraviolet light (having a peak intensity at the wavelength w0) emitted from the LD unit 211 is reflected by the light separation element 212, condensed by the collimator lens 213, and irradiated onto the wavelength conversion element 214 as excitation light.

Figure 10:
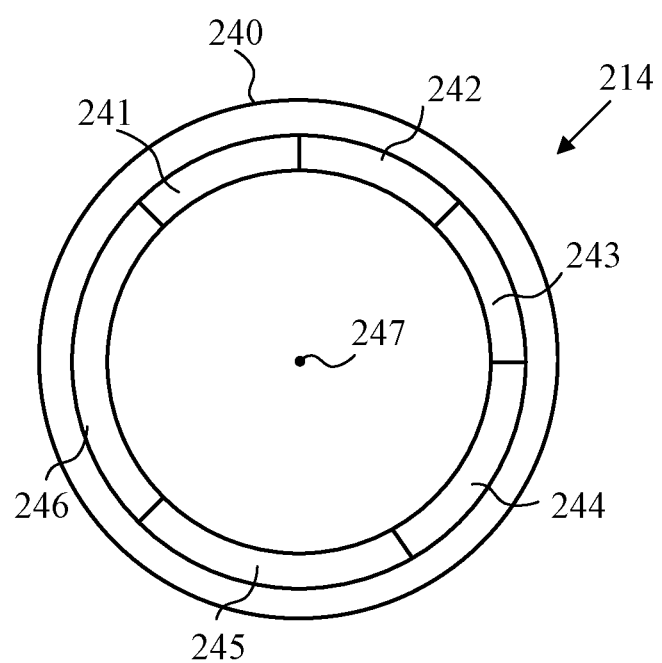
FIG. 10 illustrates a configuration of a wavelength conversion element according to example 3.

FIG. 10 illustrates a configuration of a wavelength conversion element 214 according to this example. The wavelength conversion element 214 is rotationally driven around its center 247 by the motor M illustrated in FIG. 9. The wavelength conversion element 214 has a disk-shaped reflective substrate 240 having a light reflection characteristic. In addition, the reflective substrate 240 includes a first quantum dot layer (first wavelength converter) 241, a second quantum dot layer (second wavelength converter) 242, a third quantum dot layer (third wavelength converter) 243, a fourth quantum dot layer (fourth wavelength converter) 244, a fifth quantum dot layer (fifth wavelength converter) 245, and a sixth quantum dot layer (sixth wavelength converter) 246 that are unequally arranged in the circumferential direction. The first to sixth quantum dot layers 241 to 246 correspond to the first to sixth regions, respectively.

As the wavelength conversion element 214 rotates, the excitation light is sequentially (circularly) applied to the first to sixth quantum dot layers 241 to 246.

Each of the first to sixth quantum dot layers 241 to 246 includes a plurality of quantum dots or quantum rods for the wavelength conversion of the near-ultraviolet light as the excitation light (incident light) to light having a different wavelength band. In addition, the first to sixth quantum dot layers 241 to 246 (quantum dots or quantum rods included therein) convert the near-ultraviolet light into the light of different wavelength bands.

The first quantum dot layer 241 converts the near-ultraviolet light into first green light (first light having a first peak intensity at a first wavelength w1) as light in a first wavelength band. The second quantum dot layer 242 converts the near-ultraviolet light into second green light (second light having a second peak intensity at a second wavelength w2) as light in a second wavelength band. The third quantum dot layer 243 converts the near-ultraviolet light into first red light (third light having a third peak intensity at a third wavelength w3) as light in a third wavelength band.

The fourth quantum dot layer 244 converts the near-ultraviolet light into second red light (a fourth light having a fourth peak intensity at a fourth wavelength w4) as light in a fourth wavelength band. The fifth quantum dot layer 245 converts the near-ultraviolet light into first blue light (fifth light having a fifth peak intensity at a fifth wavelength w5) as light in a fifth wavelength band. The sixth quantum dot layer 246 converts the near-ultraviolet light into second blue light (sixth light having a sixth peak intensity at a sixth wavelength w6) as light in a sixth wavelength band.

The reflective substrate 240 reflects light traveling to the side opposite to the light incident side in the first to sixth quantum dot layers 241 to 246 so as to return the light to the light incident side.

When the excitation light is emitted to the first quantum dot layer 241, the first green light is emitted from the wavelength conversion element 214, and when excitation light is emitted to the second quantum dot layer 242, the second green light is emitted from the wavelength conversion element 214. When the excitation light is irradiated to the third quantum dot layer 243, the first red light is emitted from the wavelength conversion element 214, and when the excitation light is irradiated to the fourth quantum dot layer 244, the second red light is emitted from the wavelength conversion element 214. When the excitation light is emitted to the fifth quantum dot layer 245, the first blue light is emitted from the wavelength conversion element 214, and when the excitation light is emitted to the sixth quantum dot layer 246, the second blue light is emitted from the wavelength conversion element 214.

The light emitted from the wavelength conversion element 214 is collimated by the collimator lens 213, passes through the light separation element 212, and enters the illumination optical system 202. The light incident on the illumination optical system 202 is condensed toward the incident surface of the rod integrator 222 by the condenser lens 221 and emitted from the emission surface while totally reflected inside the rod integrator 222. The light emitted from the rod integrator 222 passes through the first lens 223 and the second lens 224 and enters the modulation surface of the digital micro mirror device 225. The first and second lenses 223 and 224 make conjugate the exit surface of the rod integrator 222 and the modulation surface of the digital micro mirror device 225 with each other. The light modulated by the digital micro mirror device 225 is projected onto the projection surface by the projection lens 204.

The projector according to this example is a time-division type projector that projects a color image by quickly switching the green light, the red light, and the blue light incident on the digital micro mirror device 225. The color of the image signal input to the projector contains three primary colors of red (R), green (G), and blue (B). Therefore, the G image is projected while the excitation light is irradiated onto the first and second quantum dot layers 241 and 242, and the R image is projected while the excitation light is irradiated on to the third and fourth quantum dot layers 243 and 244. The B image is projected while the excitation light is irradiated onto the fifth and sixth quantum dot layers 245 and 246.

For example, while the excitation light is irradiated onto the first quantum dot layer 241 in the 3D display, a G image by the first green light is displayed as the right eye image, and while the excitation light is irradiated onto the second quantum dot layer 242, a G image by the second green light is displayed as the left eye image. While the excitation light is irradiated onto the third quantum dot layer 243, an R image by the first red light is displayed as the right eye image, and while the excitation light is irradiated onto the fourth quantum dot layer 244, an R image by the second red light is displayed as a left eye image. While the excitation light is irradiated to the fifth quantum dot layer 245, a B image by the first blue light is displayed as the right eye image, and while the excitation light is irradiated to the sixth quantum dot layer 246, a B image by the second blue light is displayed as the left eye image. Thereby, a single projector can provide the wavelength division 3D display.

While this example uses the near-ultraviolet light for the excitation light, the blue light may be used as in example 1. In this case, a diffusion layer is provided in the fifth region in place of the fifth quantum dot layer 245, and the light separation element 12 illustrated in FIG. 2 is used in place of the light separation element 212.

Example 4

Figure 11:
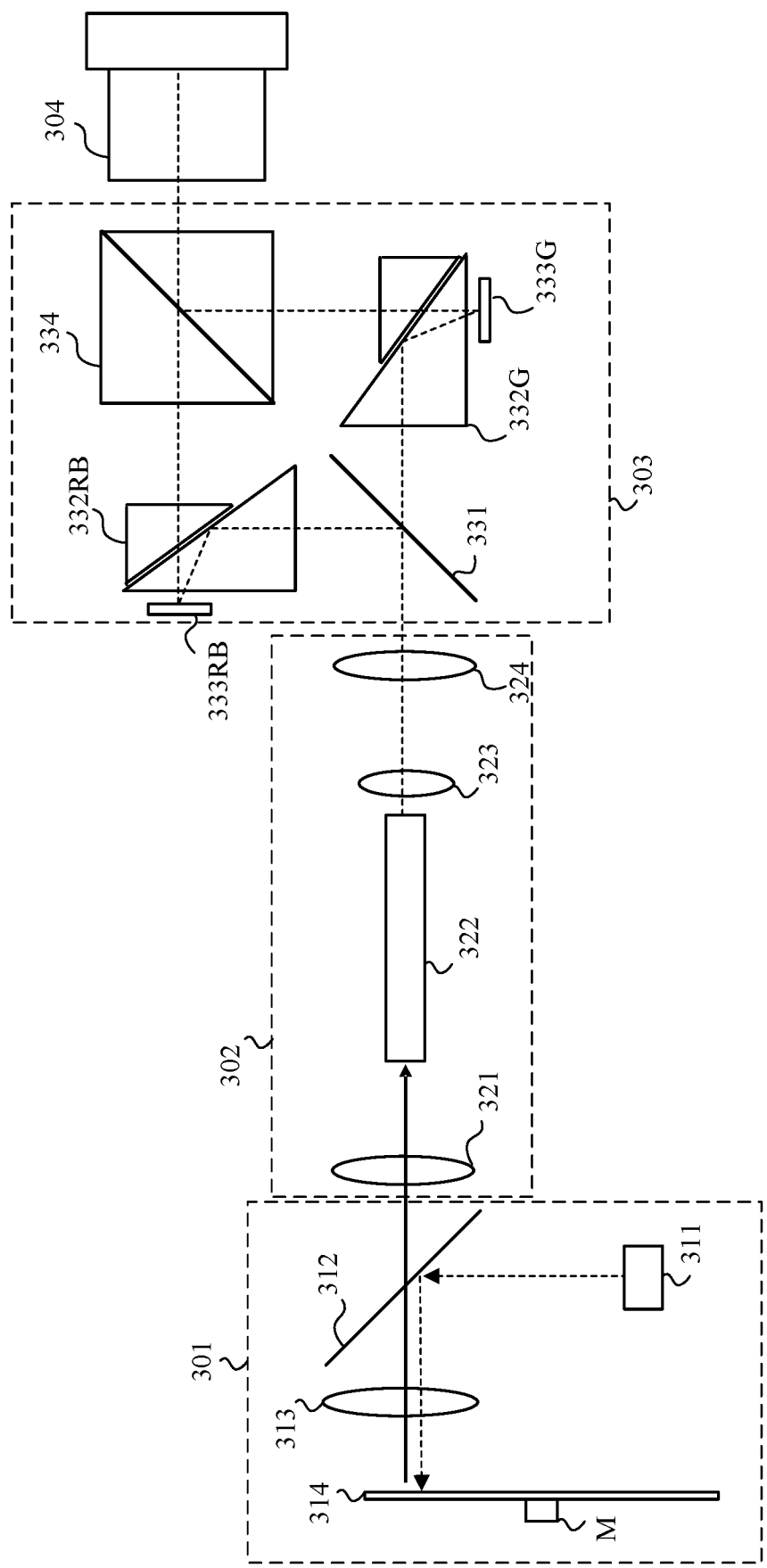
FIG. 11 illustrates a configuration of a projector according to example 4 of the present invention.

FIG. 11 illustrates a configuration of an optical system for a projector according to example 4 of the present invention. The projector has a light source unit 301, an illumination optical system 302, a color separation and combination system 303, and a projection lens 304 as a projection optical system.

The light source unit 301 includes an LD unit 311, a light separation element 312, a collimator lens 313, and a wavelength conversion element 314. The LD unit 311 includes a plurality of ultraviolet light LDs. The light separation element 212 has a characteristic of reflecting ultraviolet light and of transmitting visible light.

The near-ultraviolet light (having a peak intensity at the wavelength w0) emitted from the LD unit 311 is reflected by the light separation element 312, condensed by the collimator lens 313, and irradiated onto the wavelength conversion element 314 as the excitation light.

Figure 12A:
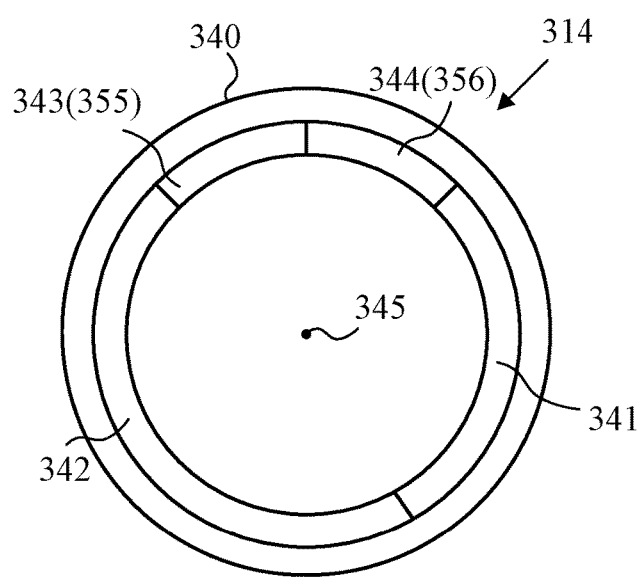
FIGS. 12A to 12C illustrate configurations of a wavelength conversion element according to example 4.

FIG. 12A illustrates a configuration of a wavelength conversion element 314 according to this example. The wavelength conversion element 314 is rotationally driven around its center 345 by the motor M illustrated in FIG. 11. The wavelength conversion element 314 has a disk-shaped reflective substrate 340 having a light reflection characteristic. In addition, the reflective substrate 340 has a first region 341, a second region 342, a third region 343 and a fourth region 344 that are unequally arranged in the circumferential direction.

Figure 12B:
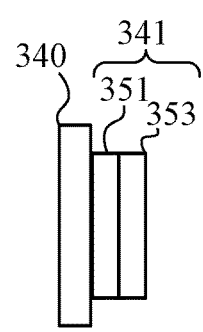
Figure 12C:
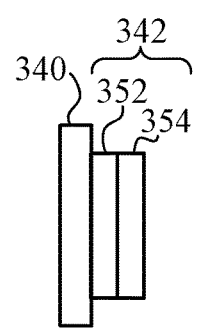

FIG. 12B illustrates a section of the first region 341 of the reflective substrate 340 (wavelength conversion element 314) taken along the radial direction. The first region 341 includes a third quantum dot layer 153 and a first quantum dot layer 351 laminated in this order from the light incident side. FIG. 12C illustrates a section of the second region 342 of the reflective substrate 340 taken along the radial direction. The second region 342 includes a fourth quantum dot layer 354 and a second quantum dot layer 352 laminated in order from the light incident side. The third region 343 has a fifth quantum dot layer 355, and the fourth region 344 has a sixth quantum dot layer 356.

Each of the first to sixth quantum dot layers 351 to 356 includes a plurality of quantum dots or quantum rods for the wavelength conversion of the near-ultraviolet light as the excitation light (incident light) into light having a different wavelength band. In addition, the first to sixth quantum dot layers 351 to 356 (quantum dots or quantum rods contained therein) convert the near-ultraviolet light into light of different wavelength bands.

The first quantum dot layer 351 converts the near-ultraviolet light into first green light (first light having a first peak intensity at a first wavelength $w1$) as light in a first wavelength band. The second quantum dot layer 352 converts the near-ultraviolet light into second green light (second light having a second peak intensity at a second wavelength $w2$) as light in a second wavelength band. The third quantum dot layer 353 converts the near-ultraviolet light into first red light (third light having a third peak intensity at a third wavelength $w3$) as light in a third wavelength band. The fourth quantum dot layer 354 converts the near-ultraviolet light into second red light (fourth light having a fourth peak intensity at a fourth wavelength $w4$) as light in a fourth wavelength band. The fifth quantum dot layer 355 converts the near-ultraviolet light into first blue light (fifth light having a fifth peak intensity at a fifth wavelength $w5$) as light in a fifth wavelength band. The sixth quantum dot layer 356 converts the near-ultraviolet light into second blue light (sixth light having a sixth peak intensity at a sixth wavelength $w6$) as light in a sixth wavelength band.

The reflective substrate 340 reflects light traveling to the side opposite to the light incident side in the first to fourth regions 341 to 344 so as to return the light to the light incident side.

When the excitation light is irradiated onto the first region 341, the first green light and the first red light are emitted from the wavelength conversion element 314, and when the excitation light is irradiated onto the second region 342, the second green light and the second red light are emitted from the wavelength conversion element 314. When excitation light is irradiated onto the third region 343, the first blue light is emitted from the wavelength conversion element 314, and when the excitation light is irradiated onto the fourth region 344, the second blue light is emitted from the wavelength conversion element 314.

The light emitted from the wavelength conversion element 314 is collimated by the collimator lens 313, passes through the light separation element 312, and enters the illumination optical system 302. The light incident on the illumination optical system 302 is condensed toward the incident surface of the rod integrator 322 by the condensing lens 321 and emitted from the emission surface while totally reflected inside the rod integrator 322. The light emitted from the rod integrator 322 passes through the first lens 323 and the second lens 324 and enters the color separation and combination system 303. The first and second lenses 323 and 324 make conjugate the exit surface of the rod integrator 322 and the modulation surface of each digital micro mirror device described later with each other.

The red light and blue light are reflected by the dichroic mirror 331, and the green light transmits through it among the light incident on the color separation and combination system 303. The transmitting green light is totally reflected by a first TIR prism 332G and enters a first digital micro mirror device 333G. The light modulated by the first digital micro mirror device 333G is reflected by a dichroic prism 334 and projected onto the projection surface by the projection lens 304.

On the other hand, the red light and the blue light reflected by the dichroic mirror 331 are totally reflected by a second TIR prism 332RB, and enter a second digital micro mirror device 333RB. The light modulated by the second digital micro mirror device 333RB is transmitted through the dichroic prism 334 and projected onto the projection surface by the projection lens 304.

While the excitation light is irradiated onto the first region 341 and the second region 342, the projector according to this example displays a G image via the first digital micro mirror device 333G and an R image via the second digital micro mirror device 333RB. While the excitation light is irradiated to the third region 343 and the fourth region 344, the projector displays a black image via the first digital micro mirror device 333G and a B image via the second digital micro mirror device 333 RB.

This example uses the near-ultraviolet light for the excitation light, but the blue light may be used as in example 1. In this case, a diffusion layer is provided in the third region 343 instead of the fifth quantum dot layer 355, and the light separation element 12 illustrated in FIG. 2 is provided instead of the light separation element 312.

Each of the above examples can realize a wavelength conversion element that can emit a plurality of color light fluxes having a good color purity and luminance with a simple configuration, and a projector that can project a high-quality image.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-084263, filed on Apr. 25, 2018, which is hereby incorporated by reference herein in its entirety.

What is claimed is:

1. A wavelength conversion element comprising:
a first wavelength converter configured to convert light from a light source into first light having a first wavelength band different from a wavelength band of the light from the light source, and a first peak intensity at a first wavelength;
a second wavelength converter configured to convert the light from the light source into second light having a second wavelength band different from the wavelength band of the light from the light source, and a second peak intensity at a second wavelength;
a third wavelength converter configured to convert the light from the light source into third light having a third wavelength band different from the wavelength band of the light from the light source, and a third peak intensity at a third wavelength; and
a fourth wavelength converter configured to convert the light from the light source into fourth light having a fourth wavelength band different from the wavelength band of the light from the light source, and a fourth peak intensity at a fourth wavelength,
wherein the following condition is satisfied
505 nm$<w1<w2<$585 nm
where $w1$ is the first wavelength and $w2$ is the second wavelength,
wherein a wavelength band having an intensity of 30% or higher of the first peak intensity in the first wavelength band and a wavelength band having an intensity of 30% or higher of the second peak intensity in the second wavelength band are different from each other,
wherein the following condition is satisfied
585 nm$<w3<w4<$670 nm
where $w3$ is the third wavelength and $w4$ is the fourth wavelength,
wherein a wavelength band having an intensity of 30% or higher of the third peak intensity in the third wavelength band and a wavelength band having an intensity of 30% or higher of the fourth peak intensity in the fourth wavelength band are different from each other, and
wherein the first wavelength converter and the third wavelength converter are laminated or mixed on a first region in the wavelength conversion element, and the second wavelength converter and the fourth wavelength converter are laminated or mixed on a second region in the wavelength conversion element.

2. The wavelength conversion element according to claim 1, further comprising:
a fifth wavelength converter configured to convert the light from the light source into fifth light having a fifth wavelength band different from the wavelength band of the light from the light source, and a fifth peak intensity at a fifth wavelength; and
a diffuser configured to diffuse the light from the light source,
wherein the following condition is satisfied
410 nm$<w0<w5<$505 nm
where $w0$ is a wavelength at which the light from the light source has a peak intensity and $w5$ is the fifth wavelength, and
wherein a wavelength band having an intensity of 30% or higher of the fifth peak intensity in the fifth wavelength band and a wavelength band having an intensity of 30% or higher of the peak intensity in the wavelength band of the light from the light source are different from each other.

3. The wavelength conversion element according to claim 2, wherein the first wavelength converter, the third wavelength converter, and the diffuser are laminated or mixed on the first region, and the second wavelength converter, the fourth wavelength converter, and the fifth wavelength converter are laminated or mixed on the second region.

4. The wavelength conversion element according to claim 2, wherein the diffuser is provided on a third region in the wavelength conversion element, and the fifth wavelength converter is provided on a fourth region in the wavelength conversion element.

5. The wavelength conversion element according to claim 1, further comprising:
a fifth wavelength converter configured to convert the light from the light source into fifth light having a fifth wavelength band different from the wavelength band of the light from the light source, and a fifth peak intensity at a fifth wavelength; and
a sixth wavelength converter configured to convert the light from the light source into sixth light having a sixth wavelength band different from the wavelength band of the light from the light source, and a sixth peak intensity at a sixth wavelength,
wherein the following condition is satisfied
410 nm<$w5$<$w6$<505 nm
where $w5$ is the fifth wavelength and $w6$ is the sixth wavelength, and
wherein a wavelength band having an intensity of 30% or higher of the fifth peak intensity in the fifth wavelength band and a wavelength band having an intensity of 30% or higher of the sixth peak intensity in the sixth wavelength band are different from each other.

6. The wavelength conversion element according to claim 5, wherein the first wavelength converter, the third wavelength converter, and the fifth wavelength converter are laminated or mixed on the first region in the wavelength conversion element, and the second wavelength converter, the fourth wavelength converter, and the sixth wavelength converter are laminated and mixed on the second region in the wavelength conversion element.

7. The wavelength conversion element according to claim 5, wherein the fifth wavelength converter is provided to a third region in the wavelength conversion element, and the sixth wavelength converter is provided to a fourth region of the wavelength conversion element.

8. The wavelength conversion element according to claim 1, wherein at least one of the first to fourth wavelength converters includes at least one of a quantum dot and a quantum rod.

9. A light source apparatus comprising:
a light source; and
a wavelength conversion element,
wherein the wavelength conversion element includes:
a first wavelength converter configured to convert light from the light source into first light having a first wavelength band different from a wavelength band of the light from the light source, and a first peak intensity at a first wavelength;
a second wavelength converter configured to convert the light from the light source into second light having a second wavelength band different from the wavelength band of the light from the light source, and a second peak intensity at a second wavelength;
a third wavelength converter configured to convert the light from the light source into third light having a third wavelength band different from the wavelength band of the light from the light source, and a third peak intensity at a third wavelength; and
a fourth wavelength converter configured to convert the light from the light source into fourth light having a fourth wavelength band different from the wavelength band of the light from the light source, and a fourth peak intensity at a fourth wavelength,
wherein the following condition is satisfied
505 nm<$w1$<$w2$<585 nm where $w1$ is the first wavelength and $w2$ is the second wavelength,
wherein a wavelength band having an intensity of 30% or higher of the first peak intensity in the first wavelength band and a wavelength band having an intensity of 30% or higher of the second peak intensity in the second wavelength band are different from each other,
wherein the following condition is satisfied
585 nm<$w3$<$w4$<670 nm
where $w3$ is the third wavelength and $w4$ is the fourth wavelength,
wherein a wavelength band having an intensity of 30% or higher of the third peak intensity in the third wavelength band and a wavelength band having an intensity of 30% or higher of the fourth peak intensity in the fourth wavelength band are different from each other, and
wherein the first wavelength converter and the third wavelength converter are laminated or mixed on a first region in the wavelength conversion element, and the second wavelength converter and the fourth wavelength converter are laminated or mixed on a second region in the wavelength conversion element.

10. An image projection apparatus comprising:
a light source apparatus; and
a light modulation element configured to modulate light from the light source apparatus, and is configured to display an image by projecting modulated light from the light modulation element onto a projection surface,
wherein the light source apparatus includes a light source and a wavelength conversion element,
wherein the wavelength conversion element includes:
a first wavelength converter configured to convert light from the light source into first light having a first wavelength band different from a wavelength band of the light from the light source, and a first peak intensity at a first wavelength;
a second wavelength converter configured to convert the light from the light source into second light having a second wavelength band different from the wavelength band of the light from the light source, and a second peak intensity at a second wavelength;
a third wavelength converter configured to convert the light from the light source into third light having a third wavelength band different from the wavelength band of the light from the light source, and a third peak intensity at a third wavelength; and
a fourth wavelength converter configured to convert the light from the light source into fourth light having a fourth wavelength band different from the wavelength band of the light from the light source, and a fourth peak intensity at a fourth wavelength,
wherein the following condition is satisfied
505 nm<$w1$<$w2$<585 nm
where $w1$ is the first wavelength and $w2$ is the second wavelength,
wherein a wavelength band having an intensity of 30% or higher of the first peak intensity in the first wavelength band and a wavelength band having an intensity of 30% or higher of the second peak intensity in the second wavelength band are different from each other,
wherein the following condition is satisfied
585 nm<$w3$<$w4$<670 nm
where $w3$ is the third wavelength and $w4$ is the fourth wavelength,
wherein a wavelength band having an intensity of 30% or higher of the third peak intensity in the third wavelength band and a wavelength band having an intensity of 30% or higher of the fourth peak intensity in the fourth wavelength band are different from each other, and wherein the first wavelength converter and the third wavelength converter are laminated or mixed on a first region in the wavelength conversion element, and the second wavelength converter and the fourth wavelength converter are laminated or mixed on a second region in the wavelength conversion element.

* * * * *